United States Patent [19]

Staggs et al.

[11] Patent Number: 4,539,817
[45] Date of Patent: Sep. 10, 1985

[54] REFRIGERANT RECOVERY AND CHARGING DEVICE

[76] Inventors: Michael J. Staggs, 3721 Dawn Dr., North Richland Hills, Tex. 76118; Gary D. Starnes, 804 Edith, Irving, Tex. 75061

[21] Appl. No.: 564,757

[22] Filed: Dec. 23, 1983

[51] Int. Cl.³ .............................................. F25B 45/00
[52] U.S. Cl. .......................................... 62/149; 62/292
[58] Field of Search ......................... 62/149, 292, 126

[56] References Cited

U.S. PATENT DOCUMENTS

| | | | |
|---|---|---|---|
| 2,977,773 | 4/1961 | De Kanter | 62/149 |
| 3,232,070 | 2/1966 | Sparano | 62/149 X |
| 3,852,974 | 12/1974 | Brown | 62/33 S |
| 3,873,289 | 3/1975 | White | 62/149 |
| 4,106,306 | 8/1978 | Saunders | 62/149 |
| 4,261,178 | 4/1981 | Cain | 62/149 |
| 4,285,206 | 8/1981 | Koser | 62/126 |
| 4,363,222 | 12/1982 | Cain | 62/292 |
| 4,384,460 | 5/1983 | Vakil | 62/149 X |

Primary Examiner—Henry Bennett
Attorney, Agent, or Firm—Charles D. Gunter, Jr.

[57] ABSTRACT

A servicing device is shown for recovering and charging refrigerant in a cooling system of the type having a compressor for circulating compressible refrigerant in a closed, pressurized system between a condenser and an evaporator to provide a cooling effect. The servicing device includes a storage container which has a fill port which is adapted to be connected by a fluid conduit to the closed, pressurized system being serviced. Heat exchange coils located within the container are cooled by a heat exchange system to create a low pressure atmosphere within the container and draw refrigerant from the closed, pressurized system into the container. The heat pump system has reversible valves to reverse the flow of auxiliary refrigerant being circulated through the system. When the refrigerant circulation is reversed, the heat exchange coils located within the storage container heats the container to create a relatively higher pressure atmosphere to charge refrigerant from the storage container into the closed, pressurized system.

4 Claims, 3 Drawing Figures

REFRIGERANT RECOVERY AND CHARGING DEVICE

BACKGROUND OF THE INVENTION

1. Field of the Invention

The present invention relates generally to a device for servicing a cooling system of the type utilizing a compressible refrigerant as the cooling medium and, specifically, to a device for drawing off and subsequently charging refrigerant in a cooling system.

2. Description of the Prior Art

Cooling systems, such as automotive air conditioning systems, periodically require servicing to insure optimum operating conditions. Additionally, maintenance on such systems generally requires shutting down the system and drawing off the coolant in order to dismantle the component parts of the system. Normally, when such cooling systems break down or require maintenance, the refrigerant is vented to the atmosphere and lost or wasted. This is because the cooling unit cannot be serviced with the refrigerant intact. Obviously, this results in a costly waste of valuable material.

It has also been determined in recent years that fluorocarbons, such as the type commonly used in cooling systems, are harmful to the environment and it is now considered desirable to prevent the uncontrolled release of refrigerants to the atmosphere. It is also a cost savings to be able to recover used refrigerants for reuse in the air conditioning system.

While various recovery and reprocessing systems are known for recovering refrigerants, such systems have, in the past, been expensive and complicated in design. Such prior systems have generally been suitable only for use in large refrigeration and air conditioning processes and are not suitable for use by the serviceman servicing small air conditioning units such as are used in vehicles or window units, or other cooling systems of the domestic type.

Because of the maintenance requirements of automotive air conditioning systems, connections are typically provided near both the low pressure suction port and the high pressure discharge port of the compressor, which connections can be conveniently utilized to recover and charge refrigerant to the system. Prior refrigerant recovery systems have typically utilized a vacuum pump which would be connected to the low pressure side of the compressor for withdrawing refrigerant from the unit being serviced and compressing the refrigerant and forcing it into a condenser to cool and condense the refrigerant into a liquid. The liquid would then be stored in a storage container. The vacuum pumps in such units are subjected to rigorous pressures and operating conditions and are subject to mechanical difficulties.

SUMMARY OF THE INVENTION

The servicing device of the invention utilizes thermal changes within a storage container to create a pressure gradient, thereby causing refrigerant to be drawn from the cooling system being serviced instead of mechanically drawing off and compressing the refrigerant being saved with a vacuum pump as was done in the past. The servicing device of the invention is used for recovering refrigerant from a cooling system of the type having a compressor for circulating a compressible refrigerant in a closed, pressurized system between a condenser and an evaporator to provide a cooling effect. The servicing device includes a storage container having a fill port which is adapted to be connected by a fluid conduit to the closed, pressurized system being serviced. Heat exchange means associated with the storage container cool the container to thereby create a low pressure atmosphere within the storage container and to maintain a pressure gradient between the storage container and the closed, pressurized system to draw refrigerant from the closed, pressurized system into the storage container.

The heat exchange means includes heat exchange coils which are located within the storage container. The heat exchange coils located within the storage container are a part of an auxiliary refrigeration system which includes a compressor which supplies compressed refrigerant gas to a condenser which, in turn, supplies condensed refrigerant liquid through an expansion valve to an evaporator. The heat exchange coils serve to cool the storage container and act as an evaporator when auxiliary refrigerant is circulated in one direction. By providing switching means for reversing the flow of auxiliary refrigerant through the heat exchange coils, the coils serve to heat the container and act as a condenser when auxiliary refrigerant is circulated in the oppposite direction. By heating the storage container interior, a high pressure atmosphere is created which forces refrigerant in the container through the fluid conduit to the system being serviced to charge the system. The auxiliary refrigerant in the heat exchange coils is isolated from the refrigerant contained within the storage container and in the system being serviced.

Additional objects, features, and advantages will be apparent in the written description which follows.

DETAILED DESCRIPTION OF THE INVENTION

Figure 1:
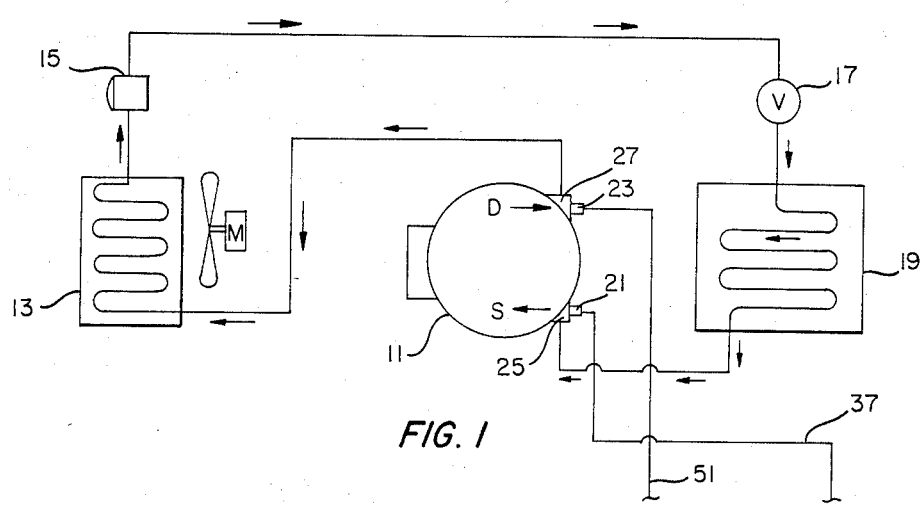
FIG. 1 is a schematic diagram of a typical vehicle air conditioning system of the type serviced by the present device.

A typical automotive air conditioning system is shown in FIG. 1. The closed and pressurized system contains a refrigerant, such as that known as R-12, which is sold by the DuPont Corporation under the trademark FREON 12. The system includes a compressor 11 which compresses the refrigerant gas and delivers it to a condenser 13 where the gas is converted to a liquid. The condenser 13 discharges through a sight glass 15 which provides visual observation of the fill level of refrigerant in the system during operation. The sight glass 15 can also include a reservoir for storing liquid refrigerant under conditions of large load fluctuations on the system and can include a filter to trap and hold moisture or solid particles which are present in the system. From the sight glass 15, the refrigerant is delivered through an expansion valve 17 to an evaporator 19 where the refrigerant is evaporated to a gas as the system provides cooling, all in a well known manner. The refrigerant gas passes from the evaporator 19 and returns to the compressor 11 to repeat the cooling cycle.

To facilitate withdrawing refrigerant and charging the system, the compressor 11 has a pair of connectors 21, 23, respectively, located at or near the low pressure suction port 25 and its high pressure discharge port 27. These connectors 21, 23, provide connections for pressure gauge readings and for additions of refrigerant and lubricating oil at either the discharge port 27 or the suction port 25 of the compressor 11.

Figure 2:
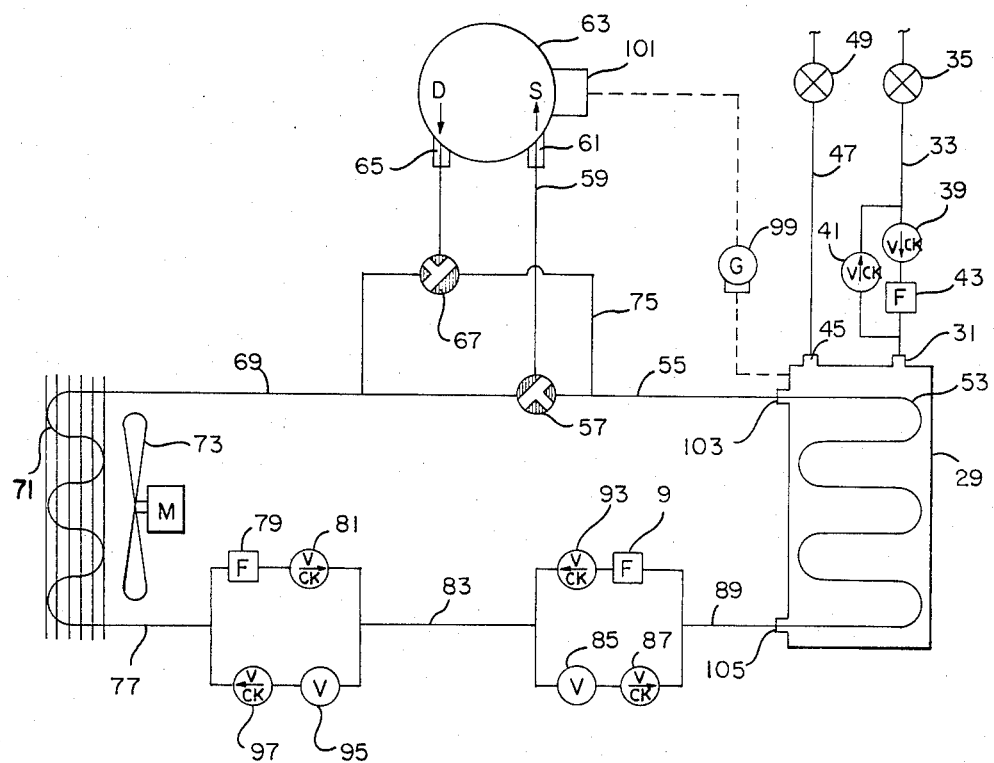
FIG. 2 is a schematic diagram of the servicing device of the invention showing the operation thereof.

The servicing device of the invention is shown in FIG. 2 and includes a storage container 29 having a gas fill port 31 which is adapted to be connected by a fluid conduit 33 to the closed, pressurized system shown in FIG. 1. The term "fluid" as used herein is intended to mean either gas or liquid. Conduit 33 also includes a supply valve 35 for connection to the fluid conduit 37 leading to the low pressure suction port 25 of the cooling system being serviced. A pair of check valves 39, 41, respectively, control the flow of fluid through fluid conduit 33. A filter 43 can be located in fluid conduit 33 between check valve 39 and the fill port 31 for removing moisture in the fluid passing to the container 29.

Storage container 29 can also include a liquid fill port 45 which is connected by a fluid conduit 47 through a supply valve 49 and through fluid conduit 51 with the high pressure discharge port 27 of the system being serviced.

The container 29 is preferably a steel cylindrical container having a series of copper coils 53 therein. One end of the continuous heat exchange coil 53 is connected to a conduit 55 and through a three way valve 57 and conduit 59 to the suction port 61 of compressor 63. The discharge port 65 of compressor 63 passes through three way valve 67 and conduit 29 to a series of exposed heat exchange coils 71 which are cooled by means of cooling fan 73.

Refrigerant passing from the discharge port 65 and through the three way valve 67 to the heat exchange coils 71 passes out conduit 77 through a filter 79 and through a check valve 81 to a conduit 83. Refrigerant passing through conduit 83 continues through an expansion valve 85 and a check valve 87 and through conduit 89 to the heat exchange coil 53 located within container 29 to cool the container interior.

By oppositely positioning the three way valves 57, 67, refrigerant is circulated through conduit 55, through the heat exchange coils 53 to heat the container interior, out conduit 89 and through the filter 91 and check valve 93 to the conduit 83. The refrigerant then continues through the expansion valve 95 and check valve 97 to the exposed heat exchange coils 71. Three way valves 57, 67 thus comprise switching means for reversing the flow of auxiliary refrigerant through the heat exchange coils 53.

A pressure sensor gauge 99 of the type known in the art senses the pressure of the refrigerant within the container 29 and is electrically wired to the compressor motor 101 for controlling the compressor 63, as will be described. The sensor 99 shuts off the compressor 63 when the container pressure rises above a predetermined limit and starts up the compressor 63 when the container pressure falls below a predetermined limit.

The operation of the present invention will now be described. The fluid conduit 33 is connected by means of supply valve 35 and conduit 37 to the low pressure suction port 25 of the vehicle air conditioning system. The supply valve 49 is connected by means of conduit 51 with the high pressure discharge port 27 of the compressor 11. The vehicle air conditioning system would be turned off and the supply valve 35 would be opened. The refrigerant pressure which was present at the discharge port 27 in the range of about 175 psi and the pressure which was present at the suction port 25 in the range of 30 psi will equalize to about 110 psi according to ambient temperature, as the pressurized refrigerant from the automotive air conditioning system is communicated to the interior of the storage container 29.

Once the pressure of the refrigerant in the air conditioning system and the storage container have equalized, the compressor 63 is started and auxiliary refrigerant is pumped from the discharge port 65 through the three way valve 67 and through conduit 69 to the exposed heat exchange coil 71. The refrigerant vapors which were compressed by the compressor 63 are cooled in the heat exchange coils 71 by the cooling fan 73 and are condensed to a liquid which passes out conduit 77 through filter 79, check valve 81, and conduit 83.

The compressed vapor of liquid refrigerant is allowed to pass through the expansion valve 85 and conduit 89 to the heat exchange coils 53 located within the interior of container 29. The refrigerant rapidly expands and vaporizes within the container coils 53, which acts as an evaporator and the interior of container 29 is cooled.

As auxiliary refrigerant continues to be circulated through the servicing device, a low pressure atmosphere is created within the interior of container 29 which creates a pressure gradient and draws refrigerant from the auto air conditioning system into the interior of container 29. By appropriately cooling the container 29, the atmosphere within the container can be reduced to approximately 5-10 psi, allowing greater than 90% recovery of refrigerant from the auto air conditioner system. The pressure sensor 99 controls the operation of the compressor motor 101 to maintain the pressure within the container 29 within acceptable limits. When the desired recovery has been achieved, the supply valve 35 can be closed and the servicing device can be removed from the auto air conditioning system.

To charge the auto air conditioner, the supply valves 35, 49 are connected as before and opened. Once the pressures have stabilized, the three way valves, 57, 67 are reversed and compressor 63 is activated to discharge refrigerant through conduit 75 and conduit 55 to the heat exchange coils 53 within container 29. The system now works in the manner of a heat pump with the coils 53 acting as a condenser and the coils 71 acting as an evaporator. The refrigerant flows oppositely from the manner previously described which results in the heat exchange coils 53 heating the interior of the storage container 29. As the container 29 is heated, a relatively higher pressure atmosphere is created which forces refrigerant through the conduits 33, 47 to charge the auto air conditioning system.

By providing appropriate couplings 103, 105 to the container 29, the container can be removed when filled and replaced by an empty container to further recover refrigerant from large air conditioning systems. Couplings 103, 105 could also be used to substitute additional filled containers which would be used to charge larger refrigeration systems.

Figure 3:
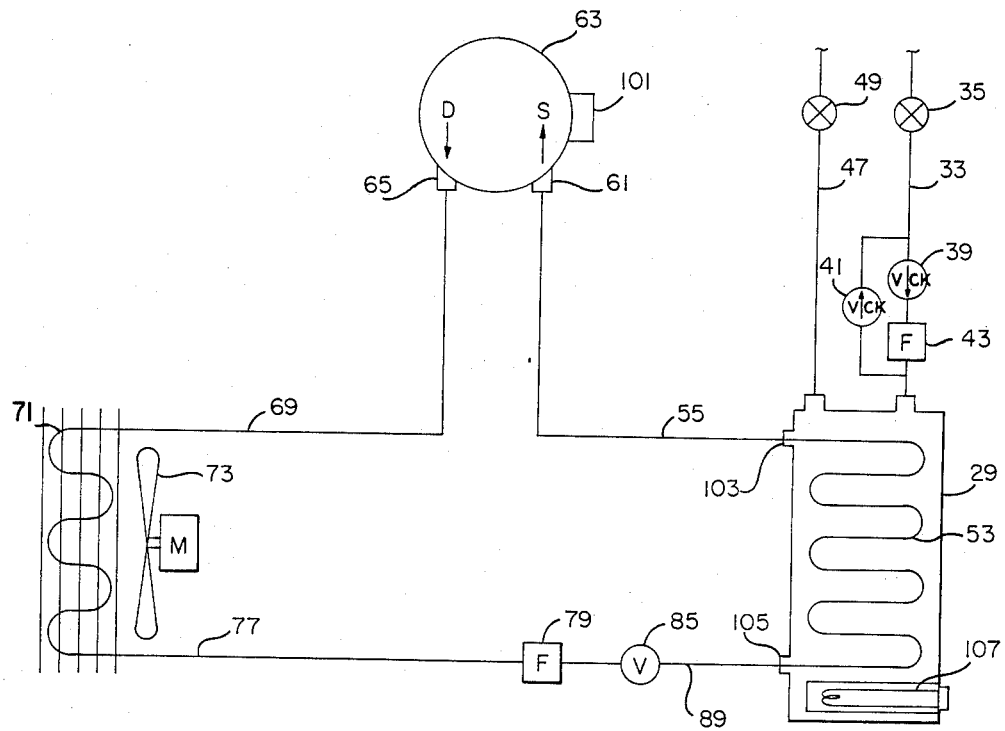
FIG. 3 is a schematic diagram of the servicing device of the invention showing a heating element as the heat exchange means.

Other means for increasing the temperature and hence the internal pressure within the container 29 can be provided to achieve the same effect as reversing the flow valves 57, 67 to charge refrigerant. For instance, a thermal heating element (107 in FIG. 3) such as the heating element in an electric hot water heater can be provided mounted in a sidewall of the container 29.

An invention has been provided with significant advantages. The servicing device of the invention utilizes a storage container with heat exchange means to create a pressure gradient or differential which can be used to recover or charge refrigerant from a unit being serviced. By utilizing thermal changes within the storage container, refrigerant can be recovered or recharged without directly coupling a vacuum pump to the system being serviced. Since applicants' compressor is used only to circulate auxiliary coolant within the heat exchange coils of the storage container, it is not subjected to the variations in pressure and operating conditions which result in damage to prior art recovery systems. Applicants' servicing device can be manufactured from readily available components and can be produced inexpensively and in a portable size. The low cost of applicants' device makes it suitable for use by the smaller auto repair or home air conditioning serviceman.

While the invention has been shown in only one of its forms, it is not limited but is susceptible to various changes and modifications without departing from the spirit thereof.

I claim:

1. A servicing device for recovering refrigerant from a totally separate and independent cooling system of the type having a compressor for circulating a compressible refrigerant in a closed, pressurized system between a condenser and an evaporator to provide a cooling effect, the servicing device comprising;

a storage container having an interior and having a fill port which is adapted to be connected by a fluid conduit to said totally separate and independent closed, pressurized system;

heat exchange coils located within the interior of said storage container in direct contact with refrigerant which is drawn from said totally separate and independent closed, pressurized system into the interior of said container, for cooling said container to thereby create a low pressure atmosphere within said storage container and to maintain a pressure gradient between said storage container and said totally separate and independent closed, pressurized system to draw refrigerant from said totally separate and independent closed, pressurized system into said storage container through said fluid conduit and fill port; and wherein said heat exchange coils located within said storage container interior are cooled by a refrigeration system distinct from the system being serviced including a compressor which supplies compressed refrigerant gas to a condenser which, in turn, supplies condensed refrigerant liquid through an expansion valve to said heat exchange coils to cool said coils.

2. A method of recovering refrigerant from a totally separate and independent cooling system being serviced of the type having a compressor for circulating a compressible refrigerant in a closed, pressurized system between a condenser and an evaporator to provide a cooling effect, the method of servicing comprising the steps of:

connecting a storage container having an interior and having a fill port to said totally separate and independent closed, pressurized system by connecting a fluid conduit between said fill port and said totally separate and independent closed, pressurized system;

providing heat exchange coils located within said storage container interior, said heat exchange coils being connected to a refrigeration unit distinct from the system being serviced for circulating compressible refrigerant through said coils; and cooling the interior of said storage container by circulating refrigerant through said heat exchange coils located within said storage container interior to thereby create a low pressure atmosphere within said storage container and to maintain a pressure gradient between said storage container and said totally separate and independent closed, pressurized system to draw refrigerant from said totally separate and independent closed, pressurized system into said storage container.

3. A method of servicing the refrigerant in a vehicle air conditioning system of the type having a compressor for circulating a compressible refrigerant in a closed, pressurized system between a condenser and an evaporator to provide a cooling effect, the servicing method comprising the steps of:

providing a storage container with a fill port and with heat exchange coils located within said storage container, said heat exchange coils being connected to a refrigeration system distinct from the system being serviced for circulating refrigerant through said heat exchanged coils to cool the interior of said container;

connecting said container fill port to the totally separate and independent air conditioning system to be serviced by a fluid conduit having a supply valve thereon;

opening the supply valve to communicate the totally separate and independent closed, pressurized system to said storage container and allowing the pressure within said container to equalize with the pressure within said closed system;

circulating refrigerant through said heat exchange coils to cool the interior of said container and provide a low pressure atmosphere therein to draw refrigerant from said totally separate and independent vehicle air conditioning system into said container;

closing said supply valve in said fluid conduit to trap the refrigerant recovered from said vehicle air conditioning system being serviced within said storage container; and shutting off the flow of refrigerant through said heat exchange coils.

4. The method of claim 3, further comprising the steps of:

opening said supply valve in said fluid conduit and allowing the pressure in said container to equalize with the pressure in said vehicle system; and supplying heat to the interior of said container by means of an electric heating element mounted in a sidewall of said storage container to thereby force refrigerant recovered from said totally separate and independent vehicle air conditioning system back into said vehicle air conditioning system.

* * * * *